(12) United States Patent
Maletsky et al.

(10) Patent No.: US 9,118,467 B2
(45) Date of Patent: Aug. 25, 2015

(54) GENERATING KEYS USING SECURE HARDWARE

(71) Applicant: Atmel Corporation, San Jose, CA (US)

(72) Inventors: Kerry David Maletsky, Monument, CO (US); Michael J. Seymour, Colorado Springs, CO (US); Brad Phillip Garner, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 147 days.

(21) Appl. No.: 13/800,422

(22) Filed: Mar. 13, 2013

(65) Prior Publication Data
US 2014/0281554 A1 Sep. 18, 2014

(51) Int. Cl.
H04L 9/14 (2006.01)
H04L 9/08 (2006.01)
H04L 9/32 (2006.01)
H04L 29/06 (2006.01)

(52) U.S. Cl.
CPC .............. H04L 9/14 (2013.01); H04L 9/0869 (2013.01); H04L 9/3268 (2013.01); H04L 63/08 (2013.01); H04L 63/12 (2013.01)

(58) Field of Classification Search
CPC ....... H04L 63/08; H04L 63/12; H04L 9/3294; H04L 9/0869; H04L 9/3268; H04I 9/14
USPC ........................................................ 713/175
See application file for complete search history.

(56) References Cited

U.S. PATENT DOCUMENTS

| 6,212,635 | B1 | 4/2001 | Reardon |
| 6,601,172 | B1 | 7/2003 | Epstein |
| 6,704,871 | B1 * | 3/2004 | Kaplan et al. ................. 713/192 |
| 6,708,273 | B1 * | 3/2004 | Ober et al. .................... 713/189 |
| 6,826,690 | B1 | 11/2004 | Hind |
| 6,961,858 | B2 | 11/2005 | Fransdonk |
| 6,996,710 | B1 | 2/2006 | Ellison et al. |
| 7,142,674 | B2 | 11/2006 | Brickell |
| 7,165,181 | B2 | 1/2007 | Brickell |
| 7,213,149 | B2 | 5/2007 | Mache |
| 7,369,856 | B2 | 5/2008 | Ovadiam |
| 7,430,668 | B1 | 9/2008 | Chen et al. |
| 7,584,359 | B2 | 9/2009 | Karaoguz et al. |
| 7,685,263 | B2 | 3/2010 | Redjaian et al. |

(Continued)

OTHER PUBLICATIONS

Non-final office action for U.S. Appl. No. 13/553,388 mailed Mar. 18, 2014, 12 pgs.

(Continued)

*Primary Examiner* — Hadi Armouche
*Assistant Examiner* — Shahriar Zarrineh
(74) *Attorney, Agent, or Firm* — Fish & Richardson P.C.

(57) ABSTRACT

A client device that is coupled to a host device sends a parent public key and an associated certificate to the host device. The parent public key, the certificate and a corresponding parent private key are stored in secure persistent storage included in a secure device associated with the client device. The client device receives instructions from the host device for generating a child private and public key pair. In response to receiving the instructions, the client device generates a child private key based on a first random number produced within the secure device, and a child public key associated with the child private key. The client device computes a first signature on the child public key using the parent private key. The client device sends the child public key and the first signature to the host device.

26 Claims, 5 Drawing Sheets

(56) References Cited

U.S. PATENT DOCUMENTS

| | | | |
|---|---|---|---|
| 7,716,497 | B1 | 5/2010 | Trimberger |
| 7,822,204 | B2 | 10/2010 | Yoshida et al. |
| 8,165,301 | B1 | 4/2012 | Bruce et al. |
| 8,321,680 | B2 * | 11/2012 | Gantman et al. ............... 713/176 |
| 8,555,072 | B2 | 10/2013 | Camenisch et al. |
| 2002/0026578 | A1 * | 2/2002 | Hamann et al. ................ 713/159 |
| 2003/0046542 | A1 * | 3/2003 | Chen et al. .................... 713/176 |
| 2003/0093663 | A1 | 5/2003 | Walker |
| 2003/0138105 | A1 * | 7/2003 | Challener et al. .............. 380/277 |
| 2004/0101141 | A1 | 5/2004 | Alve |
| 2006/0098824 | A1 * | 5/2006 | Mao ............................... 380/282 |
| 2006/0122937 | A1 * | 6/2006 | Gatto et al. ...................... 705/51 |
| 2006/0218649 | A1 | 9/2006 | Brickell et al. |
| 2006/0282901 | A1 | 12/2006 | Li et al. |
| 2007/0237366 | A1 * | 10/2007 | Maletsky ....................... 382/115 |
| 2008/0263357 | A1 * | 10/2008 | Boyen ........................... 713/168 |
| 2008/0287757 | A1 | 11/2008 | Berson et al. |
| 2009/0031141 | A1 | 1/2009 | Pearson et al. |
| 2009/0129600 | A1 | 5/2009 | Brickell et al. |
| 2010/0082984 | A1 | 4/2010 | Ellison et al. |
| 2010/0088523 | A1 * | 4/2010 | Wooten .......................... 713/189 |
| 2011/0099362 | A1 * | 4/2011 | Haga et al. ......................... 713/2 |
| 2011/0219427 | A1 | 9/2011 | Hito et al. |
| 2011/0221568 | A1 | 9/2011 | Giobbi |
| 2012/0023568 | A1 | 1/2012 | Cha et al. |
| 2013/0046547 | A1 | 2/2013 | Drucker et al. |
| 2013/0145151 | A1 | 6/2013 | Brown et al. |
| 2013/0276074 | A1 | 10/2013 | Orsini et al. |
| 2014/0025944 | A1 | 1/2014 | Malestsky et al. |
| 2014/0089670 | A1 | 3/2014 | Maletsky et al. |

OTHER PUBLICATIONS

Final office action for U.S. Appl. No. 13/628,946, mailed Jun. 6, 2014, 15 pgs.

Edman, Matthew, 'Cryptographic Security in Wireless Networks Via Physical Layer Properties,' Doctoral Dissertation, Rensselaer Polytechnic Institute, May 2011, 141 pages.

USPTO Non-final Office Action in U.S. Appl. No. 13/628,946, mailed Nov. 27, 2013, 13 pages.

Boneh, D., Boyen, X., and Shacham, H., "Short Group Signatures", Advances in Cryptology, CRYPTO 2004, Springer-Verlag, pp. 1-19.

Johnson, D., Menezes, A., and Vanstone, S., "The Elliptic Curve Digital Signature Algorithm (ECDSA)", Jul. 27, 2001, Springer-Verlag 2001, pp. 36-63.

Non-Final office action for U.S. Appl. No. 13/628,946 mailed Dec. 4, 2014, 15 pages.

Final Office Action for U.S. Appl. No. 13/553,388 mailed Sep. 30, 2014, 18 pages.

* cited by examiner

US 9,118,467 B2

GENERATING KEYS USING SECURE HARDWARE

TECHNICAL FIELD

This disclosure relates to generating cryptographic keys using a secure hardware device.

BACKGROUND

In some systems, a client device, such as a peripheral component, may be connected to a host device. The host device may want to verify that the information provided by the client device is accurate, while the client device may want to confirm that it is connected to a compatible host device.

SUMMARY

In one aspect, a client device that is coupled to a host device sends a parent public key and an associated certificate to the host device. The parent public key, the certificate and a corresponding parent private key are stored in secure persistent storage included in a secure device associated with the client device. The parent public and private keys are cryptographic keys and the certificate is a cryptographic certificate.

The client device receives instructions from the host device for generating a child private and public key pair. In response to receiving the instructions, the client device generates a child private key based on a first random number produced within the secure device, and a child public key associated with the child private key. The child private and public keys are cryptographic keys.

The client device computes a first signature on the child public key using the parent private key. The first signature is a cryptographic signature. The client device sends the child public key and the first signature to the host device.

Implementations may include one or more of the following features. The child private and public key pair may be generated within the secure device. Computing the first signature on the child public key using the parent private key may comprise combining, using the secure device, a nonce with the child public key to generate a digest. The digest may be combined with information associated with the secure device. The secure device may generate the first signature by performing an asymmetric cryptographic signature computation, using the parent private key, on the combination of the digest and the information associated with the secure device.

The information associated with the secure device may include at least one of state information of the secure device, key storage configuration information, key storage state information and command parameters.

The host device may be authenticated by the client device by setting a bit included in the secure device that is associated with the parent private key, indicating that the host device has been authenticated. Sending the parent public key and the associated certificate to the host device and generating the child private key may comprise sending the parent public key and the associated certificate to the host device, and generating the child private key, based on the bit being set in the secure device.

The host device may receive the parent public key and the associated certificate from the client device. The host device may verify validity of the parent public key by checking the signature on the associated certificate using a root public key that corresponds to a certificate authority trusted by the host device and the client device. Based on verifying the parent public key as valid, the host device may send instructions to the client device, the instructions directing the client device to generate the child private and public key pair. In response to sending the instructions, the host device may receive the child public key and the first signature. The host device may verify validity of the child public key by verifying correctness of the first signature using the verified parent public key.

Sending the parent public key and the associated certificate to the host device may be based on authenticating the host device by the client device. The client device may send a first cryptographic challenge to the host device, wherein the first cryptographic challenge is sent for authenticating the host device. The client device may receive a response to the first cryptographic challenge, the response including an initial signature associated with the first cryptographic challenge that is signed with an authentication key available to the host device, wherein a copy of the authentication key is stored in secure persistent storage included in the secure device. The client device may verify correctness of the initial signature using the copy of the authentication key stored in the secure persistent storage. The client device may authenticate the host device based on verifying the correctness of the initial signature.

The host device may receive the first cryptographic challenge from the client device. The host device may access the authentication key that is available to the host device. The host device may compute the initial signature on the first cryptographic challenge using the authentication key. The host device may send the initial signature to the client device.

The client device may receive from the host device a message including a second cryptographic challenge. The client device may compute a second signature on the second cryptographic challenge using the child private key generated by the client device. The client device may send to the host device a response to the cryptographic challenge, the response including the second signature.

The host device may send the second cryptographic challenge to the client device. The host device may receive a response to the second cryptographic challenge including the second signature. The host device may verify correctness of the second signature using the child public key that is received from the client device. Based on verifying correctness of the second signature, the host device may store the child public key as a trusted key.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

Figure 1:
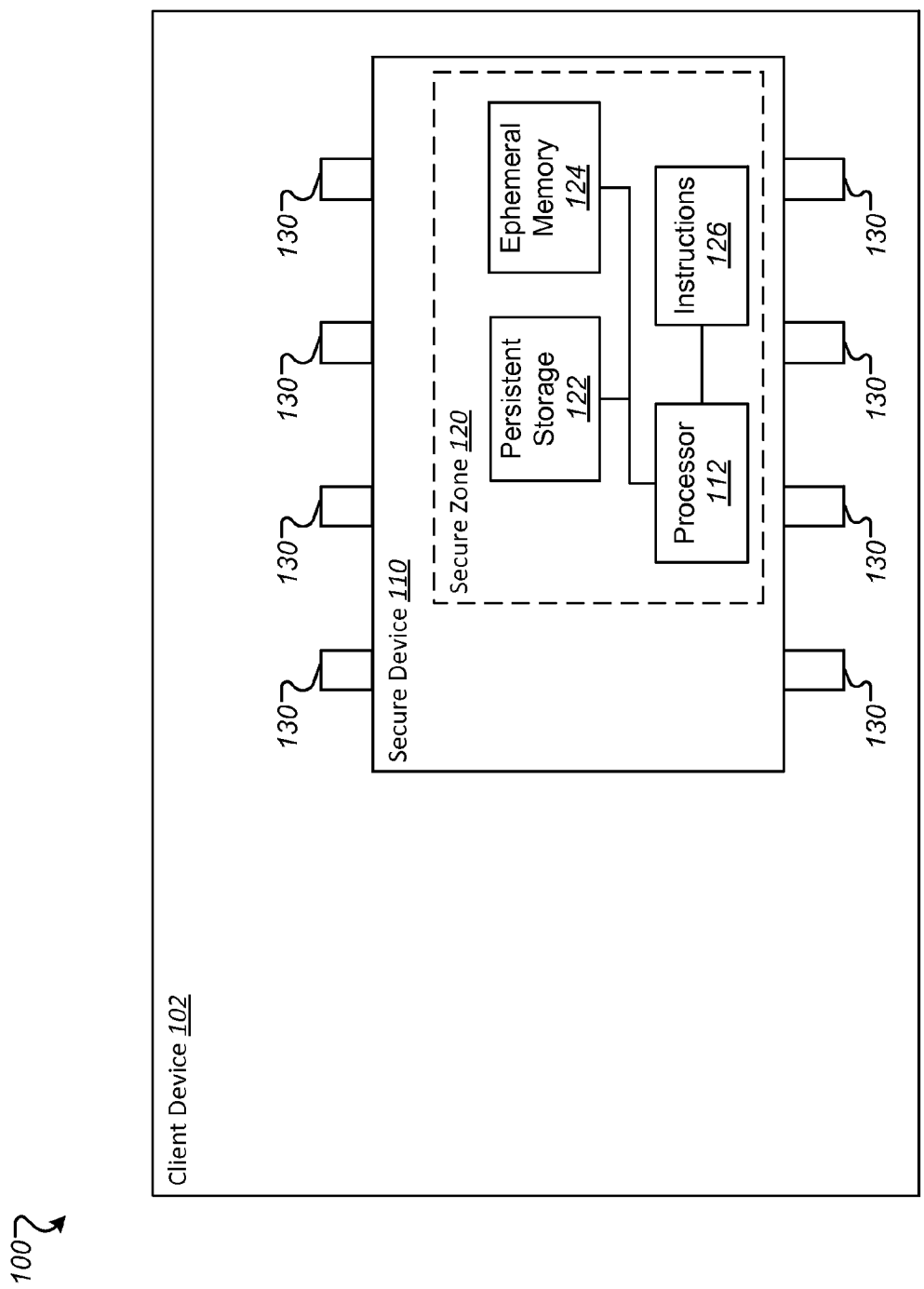
FIG. 1 is a block diagram of an exemplary client device that may be used for generating cryptographic keys using embedded hardware.

In some systems, various hardware components or devices are coupled together to perform specific operations. Some of the devices are configured to act as the host device, that is, the primary device while other components are configured to act as client or peripheral devices. Examples of such systems include a motherboard (host device) that has daughter cards (client devices) connected to it, a laptop (host device) that has a battery pack (client device) connected to the laptop, and an electronic printer (host device) that has printer cartridges (client devices) inserted in cartridge slots.

In such systems, the host device, which is also referred to simply as the host, may verify that a particular client device, which is also referred to simply as the client, connected to the host is the correct client for performing a specific operation. For instance, a printer may want to ensure that a manufacturer-approved color cartridge is loaded in a particular cartridge slot because a counterfeit color cartridge may damage the print head. The client device, on its part, may want to verify that it is connected to a host device that is authorized to use the services provided by the client device. For instance, the color cartridge may verify that the printer in which the cartridge is inserted is the correct printer model for which the cartridge is intended to be used.

Once the host verifies the client, and/or vice versa as the case may be, a trust relationship is established between the host and the client for subsequent communication between the two. Such verification by either the host or the client, or both, may be performed by using cryptographic keys that are known to both the host and the client, and used to exchange securely initial information between the two devices to establish a trust relationship.

In some implementations, the cryptographic keys may be generated using software tools at the client device and/or the host device. However, generating the keys using software may be a less secure operation compared to hardware key generation. In addition, software key generation may be slower than hardware key generation, and consequently more expensive in terms of system performance.

Some systems may mandate that the cryptographic tools be securely bound to specific physical characteristics of the client device to provide a secure bijective relationship between a client device and its associated cryptographic operations. This may be important to verify that the configuration, version or model information stored in the client device has not been modified. Proper and/or safe operation of the system may depend on the information stored in the client device being authentic. For example, medical consumables typically ship with calibration information designed specifically for that particular package; rechargeable battery systems are programmed with their particular configuration/capacity/parameters to prevent damage and/or fire during charging. It may be easier to obtain such secure bijective relationship between a client device and its associated cryptographic keys when the keys are generated using the client device hardware, compared to when the keys are generated using software tools.

Keys may be generated by client device hardware using symmetric cryptographic algorithms, which involve storing the symmetric key (often shared or derived from a shared secret) in both host and client devices. In some symmetric key systems, the keys may be generated at the client and then transferred securely to the host, which introduces a security overhead for transferring the keys. In some other symmetric key systems, the host must have the same parent secrets as the client in order to generate the shared key(s) independently, which may introduce an overhead for synchronizing the host and the client devices. The requirement to share the same secrets between the client and the host device in systems using symmetric key cryptography may result in the host device costing more, and reduces scalability by limiting the verification space to those entities that have shared the secret.

It may be useful to generate cryptographic keys using asymmetric cryptographic tools in client device hardware. This may be achieved by initializing the client device, for example at the vendor site before the client device is deployed, with a random private key that is unique and known only to the client device, and a certificate of the corresponding public key generated by a trusted certificate authority (CA). The host device can readily obtain information on the public key of the client device without a secret being shared.

The client device may authenticate messages by signing with the private key. While signing the messages, the client device may include configuration information associated with the client device, such as chip state information, as part of the signature. If the private key and/or the configuration information is effectively protected, then such a mechanism provides good confidence that the signed information was physically presented to or included within the device holding the private key.

In this context, effectively protected means that a significant effort would be required to obtain the private key value and/or the configuration information by an unauthorized component or entity. The cryptographic keys and associated cryptographic operations may be effectively protected by using dedicated hardware in the client device, such as a hardware authentication device, to store the cryptographic information, or to perform the cryptographic operations, or both. The hardware authentication device may be a secure integrated circuit (IC), also referred to as a secure chip or secure device, which may include logic to perform security operations, such as generating seeds for security challenges and cryptographic keys; computing the cryptographic keys; performing cryptographic hash operations on keys and messages to generate message digests; generating digital signatures on message digests using the cryptographic keys for authentication, message integrity, encryption, or any suitable combination of such; performing decryption operations on encrypted messages; and verifying the authenticity of received messages and keys by confirming the correctness of associated digital signatures, among other security operations. The secure device may include a secure storage area, such as hardware memory, to store the cryptographic keys and associated information. The secure storage area may be temporary memory, or persistent memory, or a suitable combination of both.

In some systems that use secure hardware embedded in client devices for generating and storing cryptographic keys, there may be additional procedures for robust security that are used to prove that a particular private/public key pair belongs to the client device that claims to hold the corresponding private key, and the private/public key pair has not been modified by some unauthorized entity.

The additional security procedures may be implemented by combining some hardware characteristic of the secure device with the cryptographic keys while performing the cryptographic operations. In this manner, the system may ensure that sensitive information is stored in a device whose origin and security properties are known. Therefore, the information is protected at the security level offered by the device type. In addition to the data, the mechanisms that are applied for securing the data are also protected such that the verifying entity can have knowledge of the selected security options, and be aware that the selected options are also securely protected. The verifying entity also should be able to verify that the private key cannot be used to sign any arbitrary externally provided data that might be used to spoof the protected information. The secure device may be configured to provide secure storage for configuration and/or state information associated with the secure device or the client device, apart from secure storage for the cryptographic keys. The configuration and/or state information associated with the secure device may be used when signatures are generated by the device.

In some systems, before the cryptographic keys are used for authentication, message integrity, or data encryption for messages sent from the client device to the connected host device, the client may verify that the host device is authorized to interact with the client. In some implementations, the verification may be performed by symmetric cryptographic mechanisms, for example by using an authorization key that is known to both the client and the host. For example, the authorization key may be embedded in the secure device in the client, and also programmed into a host device that is authorized to communicate with the client. The client may verify the authorization of the host device by using a challenge-response mechanism in which a number is signed by the host using the authorization key. Once the host is verified, the client may proceed to generate child private/public keys for communication with the host, based on long-term private/public keys that are stored in the secure device.

In some other implementations, the verification may be performed by asymmetric cryptographic means, for example by using a private/public key pair. For example, the private key may be programmed into a host device and the corresponding public key may be embedded in the secure device in the client. The client may verify the authorization of the host device by using a challenge-response mechanism in which a number sent by the client is signed by the host using the private key. The client can validate the signature on the random number using the public key embedded in the secure device.

In some systems, the host device also may verify the client device is in possession of a child private/public key pair that are used for securing communication. This may be useful, for example, to prevent replay attacks, such as a case in which an unauthorized client device plays back, to the host device, previously authenticated messages from an authorized client device. The host device may perform the verification using a challenge-response mechanism. The host device sends a challenge message to the client device, which signs the challenge using the child private key and returns the signed message to the host. The host device can subsequently verify, using the child public key, that the client device is in possession of the child private key.

Methods, devices and systems are described in the following sections to generate trusted cryptographic keys by a client device using asymmetric cryptographic tools on long-term private/public key pairs that are stored in a secure device embedded in the client device. The methods, devices and systems also may be used to authorize a host device that communicates with the client device, where the authorization of the host device happens before the client device uses the trusted cryptographic keys. The methods, devices and systems also allow the host to trust communications from the client by verifying messages from the client using asymmetric cryptographic tools.

In the following sections, the terms "client device" and "secure device" are used interchangeably to refer to the same entity, namely, a client device that has embedded within it a secure device, or some other suitable secure hardware portion, for performing cryptographic operations and storing cryptographic information, including cryptographic keys. The terms "client" and "client device" are used interchangeably to refer to the same entity, as are the terms "host" and "host device."

FIG. 1 is a block diagram of an exemplary client device 100 that may be used for generating cryptographic keys using embedded hardware. The client device 100, when coupled to a host device, may perform cryptographic operations to verify the authorization of the host device, and, based on the verification, generate cryptographic keys for securely communicating with the host device.

The client device 100 includes a body 102 and a secure device 110 that is embedded within the body 102. The secure device 110 has pins 130 attached to the body of the secure device 110. The secure device 110 includes a processor 112 and a secure zone 120 that has persistent storage 122, ephemeral memory 124 and instructions 126.

In some implementations, the secure device 110 may be a dedicated IC device that is embedded within the client device 100, while in other implementations a portion of the client device 100 may be configured for implementing the features of the secure device 110, such as the secure zone 120.

The processor 112 may be configured for performing various operations such as input/output operations, security commands and cryptographic operations. The processor 112 may include a digital processing element, or it may be a general purpose microprocessor.

The secure zone 120 is a portion of the secure device 110 that implements strong security mechanisms such that the data included in the secure zone 120 is not easily copied, cloned or modified, and any unauthorized change to the data within is detectable by a verifying device. The persistent storage 122 is a section of the secure zone that includes persistent memory. For example, the persistent storage 122 may be an electronically erasable read-only memory (EEPROM) array. Alternatively, the persistent storage 122 may be a flash memory, or a hard drive, or any other suitable storage mechanism that is configured for storing data in a persistent manner. As indicated previously, the persistent storage 122 may be used for storing cryptographic keys, miscellaneous read/write, read-only or secret data, consumption logging, and security configuration. Access to the various sections of the persistent storage may be restricted in a variety of ways and then the configuration locked to prevent changes.

The ephemeral memory 124 is another section of the secure zone that is used for temporary storage of data. For example, the ephemeral memory 124 may be a static random access memory (SRAM) where the results of cryptographic operations are buffered during secure communications exchanges with a verifying device. In some implementations, the ephemeral memory 124 may be used to store the input command or output result and intermediate computation values. The entire contents of the ephemeral memory 124 may be invalidated whenever the chip goes into sleep mode or the power is removed.

The instructions module 126 is a section of the secure zone 110 that stores various instructions performed by the device 100. For example, the instructions module 126 may include cryptographic instructions that are configured to cause the processor 112 to perform cryptographic operations on the data stored in the persistent storage 122 and in the ephemeral memory 124.

In some implementations, the processor 112 may be included in the secure zone 120, while in other implementations the processor 112 may be outside the secure zone. In some implementations, the secure zone may encompass the whole body of the secure device 110.

The pins 130 couple the secure device 110 to the body 102 of the client device 100. In some implementations, the pins 130 protrude from the body of the secure device 110, while in other implementations, the pins 130 may not protrude from the body of the secure device 110. The pins 130 are configured for providing an interface between the client device 100 and the data and instructions in the secure device 110. The pins may also be configured for connecting a power source to the secure device 110. For example, the pins 130 may provide a high-speed single pin interface. Alternatively, or in addition, the pins 130 may provide a 1 Megahertz (MHz) standard inter-integrated circuit (I2C) interface using two pins, or alternatively various single wire interface protocols using a single pin. Although eight pins 130 are shown in FIG. 1, the secure device 110 may include a different number of pins which may be less than or greater than the number shown.

The secure device 110, and in particular the secure zone 120, provides a wide array of defensive mechanisms that are configured to prevent physical attacks on the secure device 110, or logical attacks on the data transmitted between the secure device 110 and the client device 100, and/or between the client device 100/secure device 110 combination and the system in which the client device 100 is used. The secure zone 120 may implement hardware restrictions on the ways in which the cryptographic keys are generated or used within the secure zone, which provides additional security against attacks.

In some implementations, a unique serial number is associated with the secure device 110, which may be stored in the persistent storage 122. By using cryptographic instructions 126 that are supported by the secure device 110, a host system may verify that the serial number is authentic and not a copy.

In some implementations, the instructions 126 provide a flexible command set that allows the secure device 110 to be used in the client device 100 in a wide variety of applications. For example, the secure device 110 may be used in anti-counterfeiting to validate the authenticity of a removable, replaceable, or consumable client device 100 such as printer ink tanks, electronic daughter cards, or other spare parts, or a software/firmware module or memory storage element.

As another application, the secure device 110 may be used for protection of firmware or media. For example, the instructions 126 may validate code stored in flash memory at boot to prevent unauthorized modifications, encrypt downloaded program files as a common broadcast or uniquely encrypt code images to be usable on a single system only.

Another application of the secure device 110 may be in session key exchange. For example, the secure device 110 may be used by the client device 100 to exchange securely and easily session encryption keys for use by an encryption/decryption engine in the system microprocessor to support a confidential communications channel or an encrypted download.

Yet another application of the secure device 110 may be in secure data storage. For example, secret keys may be stored in the persistent storage 122 for use by cryptographic accelerators in standard microprocessors. The persistent storage 122 also may be used to store data for configuration, calibration, electronic purse value, consumption data, or other secrets. By supporting encrypted/authenticated reads and writes, the secure device 110 may provide programmable protection.

The secure device 110 also may be used for password checking. For example, the instructions 126 may cause the processor 112 to validate user entered passwords without letting the expected value become known, map simple passwords to complex ones and securely exchange password values with remote system. In order to perform such operations, the ephemeral memory 124 may be used as a "scratchpad" to store intermediate results of cryptographic computations.

In some implementations, the secure device 110 may incorporate a number of physical security features that are designed to protect the contents of the persistent storage 122 from unauthorized exposure. For example, the secure device 110 may include an active shield over the part of the device that houses the persistent storage 122. Alternatively, or in addition, the secure device 110 may include internal memory encryption, glitch protection or voltage tamper detection, or any combination of the above, or any other suitable mechanism. In some implementations, pre-programmed transport keys stored on the secure device 110 may be encrypted in such a way as to make retrieval of their values using outside analysis very difficult. In some implementations, both the logic clock and logic supply voltage for the secure device 110 may be internally generated, preventing any direct attack on these two signals using the pins 130.

Figure 2:
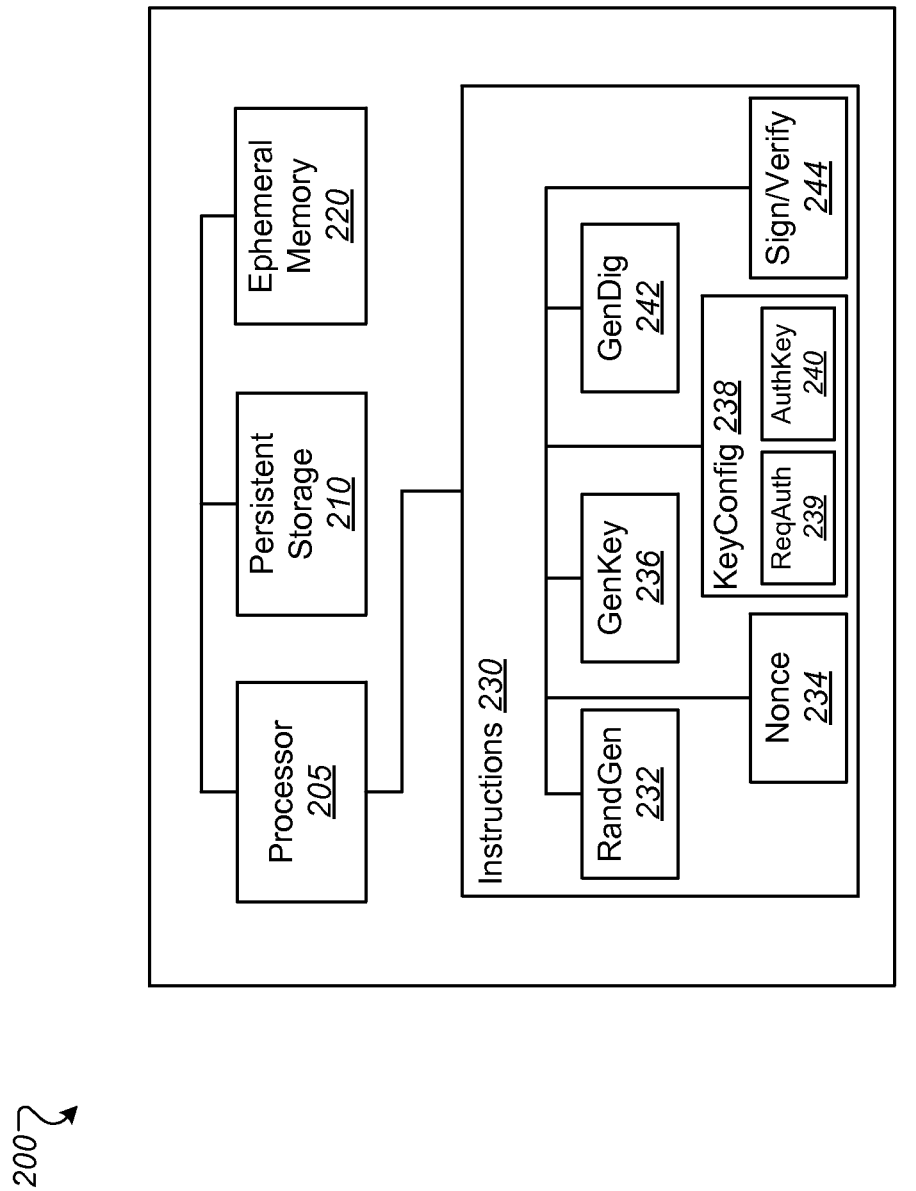
FIG. 2 is a block diagram of sections within a secure zone of a secure device that is used for cryptographic operations and storage.

FIG. 2 is a block diagram of sections within a secure zone 200 of a secure device that is used for cryptographic operations and storage. In particular, FIG. 2 illustrates some of the cryptographic instruction modules that may be included in the secure zone 200 for providing strong security. The device may be same as the secure device 110 and the secure zone 200 may be same as the secure zone 120.

The secure zone 200 includes processor 205, persistent storage 210, ephemeral memory 220 and instructions 230. The instructions 230 include modules RandGen 232, Nonce 234, GenKey 236, KeyConfig 238, Sense 240, GenDig 242 and Sign/Verify 244. KeyConfig 238 includes ReqAuth 239 and AuthKey 240.

The processor 205 is similar to the processor 112. As described previously, in some implementations, the processor 205 may be included in the secure zone 200, while in other implementations the processor 205 may be outside the secure zone.

The persistent storage 210 is similar to the persistent storage 122, while the ephemeral memory 220 is similar to the ephemeral memory 124. The instructions module 230 stores various instructions performed by the secure device that includes the secure zone 200, such as the secure device 110. As illustrated, the instructions module 230 includes various modules, each of which is associated with a set of instructions that is configured to cause the processor 205 to perform certain operations on data stored in the persistent storage 210 and in the ephemeral memory 220.

The RandGen module 232 is associated with generating a random number that is used as a seed for cryptographic operations performed by the secure device that includes the secure zone 200, such as secure device 110. For example, the Rand- Gen module 232 may include a random number generator that returns a certain number of random bytes (for example, 32 random bytes) to the system. In some implementations, the secure device combines this generated random number with a separate input number to form a "nonce" that is stored within the secure device and may be used by subsequent commands.

In some implementations, random numbers are generated from a combination of the output of a hardware random number generator and an internal seed value, which is not externally accessible. The internal seed is stored in the persistent storage 210 and may be updated once after every power-up or sleep/wake cycle. After the update, this seed value may be retained in registers within the secure device that are invalidated if the secure device enters sleep mode or the power is removed.

In some implementations, there may be an endurance specification for the persistent storage 210 that limits the number of times the seed in the persistent storage can be updated. In such cases, the secure device may be configured to manage the power cycles such that the number of updates of the seed value are reduced. In certain circumstances, the secure device may suppress the seed update using parameters associated with other instruction modules.

The secure device may use the RandGen module 232 to provide the input challenge to a message authentication code (MAC) command on some separate chip that is configured for cryptographic authentication operations. In some implementations, the secure device may provide a special "Random" command for such uses without affecting the internally stored nonce. As another example, the random number generator may be used to provide the input challenge to a message sent to a host device to verify whether the host device is authorized to communicate with the client device in which the secure device is embedded The Nonce module 234 is associated with instructions for generating a nonce for use by a subsequent cryptographic operation. The nonce may be generated by combining an internally generated random number with an input value from the system. The resulting nonce is stored internally in ephemeral memory 220, and the generated random number is returned to the system.

The input value may be designed to prevent replay attacks against the host device in the system—the input value may externally generated by the system and passed into the secure device using the instructions associated with the Nonce module 234. The input value may be any value that changes consistently, such as a nonvolatile counter, current real time of day, or it can be an externally generated random number.

To provide a nonce value for subsequent cryptographic operations, the Nonce module 234 may be configured for generating a message digest of an input number and output random number. The resulting message digest is the nonce value, which may be stored in a register in the secure device. The nonce can then be used by a subsequent cryptographic operation.

In some implementations, the actual nonce value may be used by an external system. In such implementations, the nonce value may be externally computed and stored externally to complete the execution of commands by the external system. In some implementations, the nonce may be a fixed value that is chosen by the host system.

In this context, a nonce is an arbitrary number that is used only once in a cryptographic communication between devices. The nonce may be a random or pseudo-random number issued in an authentication protocol to ensure that old communications cannot be reused in replay attacks. A nonce also may be used to ensure security for a stream cipher. Where the same cryptographic key is used for more than one message then a different nonce may be used to ensure that the key stream is different for different messages encrypted with that key. Often the message number is used.

To ensure that a nonce is used only once, it should be time-variant (including a suitably fine-grained timestamp in its value), or generated with enough random bits to ensure a probabilistically insignificant chance of repeating a previously generated value.

A message digest, in this context, is associated with a cryptographic hash function that takes an arbitrary block of data and returns a fixed-size bit string, the (cryptographic) hash value, such that any change to the data, either accidental or intentional, will change the hash value with very high probability. The data to be encoded is often called the "message," and the hash value is sometimes called the message digest, or simply as the digest.

For a cryptographic hash function that provides strong security, even though it may be relatively easy to compute the digest for any given message, it is infeasible to do the reverse computation, that is, generate a message that has a digest. In addition, it is infeasible to modify a message without changing the digest, or to find two different messages with the same digest.

Referring back to the GenKey module 236, the digest calculation can be performed using either a public key that is computed based on a private key stored in persistent storage 210, or using a public key already stored in the persistent storage. If the latter, then appropriate checks for prior authentication, limited use or other access restrictions may be performed on the persistent storage location.

The GenKey module 236 is associated with instructions for key computation and digest calculation. For example, the GenKey module 236 includes instructions configured for creating a new, random private key and writing that key into persistent storage 210. In some implementations, the random number generator seed will be automatically updated prior to the execution of these instructions, if the random number generator seed has not been already updated in the present power cycle.

The GenKey module 236 also may include instructions for generating a public key, such as an Elliptic Curve Cryptography (ECC) public key, based on a private key stored in the persistent storage. These instructions may be used to avoid storing the public key on the secure device at the expense of the time required to regenerate it.

In addition, the GenKey module 236 may include instructions for combining a public key with a temporary key value stored in ephemeral memory 220, calculating a cryptographic message digest, such as a 256 bit Secure Hash Standard (SHA-256) digest, of the resulting message and placing the digest back in ephemeral memory 220. The calculated digest can be used as the message for an internal signature or as a component of a MAC computation.

KeyConfig 238 represents a number of bits (a "bit field") associated with instructions for restricting actions that can be performed using information stored in the secure zone 200. In some implementations, cryptographic keys and associated security parameters are stored in specific areas of the secure zone, such as in predetermined locations in the persistent storage that are called memory slots. Each memory slot may be associated with its own KeyConfig 238 bit field. The values of the KeyConfig 238 bits for each memory slot indicate the permissions associated with the memory slot.

ReqAuth 239 and AuthKey 240 indicate settings for one or more of the bits of KeyConfig 238. For example, in some implementations, the number of bits of KeyConfig 238 is 16.

ReqAuth 239 may be the value for the $8^{th}$ bit of KeyConfig 238, while AuthKey 240 may be the value for bits 9-12 of KeyConfig 238.

ReqAuth 239, when set to 1, indicates that before the cryptographic key stored in the associated memory slot can be used, an authentication using an authorization key must be completed successfully. The authorization key is indicated by the value of AuthKey 240 for the same KeyConfig 238 as the ReqAuth 239. For example, the value of AuthKey 240 may map to the address of a memory slot that stores the authorization key.

The GenDig module 242 is associated with instructions for generating a digest. In some implementations, the instructions corresponding to the GenDig module 242 uses a hashing function, such as SHA-256 or the MD5 message-digest algorithm, to generate a digest by combining a value stored in persistent storage 210 with contents of a location in ephemeral memory 220 that stores a temporary key value. The value stored in persistent storage 210 can come from one of the data locations or configuration zone in persistent storage 210, page locations for one-time passwords (OTP) present in persistent storage 210, or retrieved from some hardware transport key array. In some implementations, the value stored in persistent storage 210 may be a key or some other secret value. In such implementations, the digest may serve to connect the authentication action to a diversity of secret values.

The generated digest may be stored in ephemeral memory 220, and used in several ways. For example, the digest may be included as part of a message used by cryptographic operations, such as those associated with the Sign/Verify module 244, to generate or verify a signature. In such cases, the digest may serve to authenticate data stored in data locations or OTP page locations in persistent storage 210. As another example, the digest may be used as a data protection digest to provide authentication and/or confidentiality for the data when used by a read or write operation. In yet another example, the instructions associated with the GenDig module 242 may be used for secure personalization by using a value from a transport key array. The resulting data protection digest would then be used by a write operation.

The Sign/Verify module 244 is associated with instructions for generating a signature, or verifying a signature, or both. In some implementations, the instructions for generating a signature and the instructions for verifying a signature may be associated with different modules, for example, a sign module and a different verify module respectively. However, in other implementations, the instructions may be combined in the same module, as illustrated in FIG. 2.

Some of the instructions corresponding to the Sign/Verify module 244 are configured for generating a signature using, for example, the Elliptic Curve Digital Signature Algorithm (ECDSA). A private key, such as an ECC private key, stored in persistent storage 210 may be used for computing the signature on a message, which may be generated either internal to the secure device, or externally. In case of external message generation, the system may externally compile the information to be signed, and compute the digest of that information using instructions for an external hash algorithm. The digest is then loaded into ephemeral memory 220 using, for example, the instructions corresponding to the Nonce module 234.

For internal message generation, the message that is to be signed is generated internal to the secure device. For example, the message may include the output of instructions corresponding to the GenKey module 236 or the GenDig module 242, along with various other state information related to the secure device. The output of the instructions corresponding to the GenKey module 236 or the GenDig module 242 may be placed in ephemeral memory 220 and combined with configuration information. In this manner, the information being authenticated by the secure device with the secure zone 200 includes information corresponding to the state or configuration of the secure device to provide strong security.

Some of the instructions corresponding to the Sign/Verify module 244 are configured for verifying whether a signature has been correctly generated from a given message and public key. In some implementations, the verification may be performed in an external mode, in which the public key to be used is an input parameter for the instructions. Prior to executing the instructions, the message corresponding to the signature is written to ephemeral memory, for example using the instructions corresponding to the Nonce module 234. In the external mode, the secure device accelerates the public key computation and returns a Boolean value (for example, "True" or "False") as a result of the verification.

In some implementations, the verification may be performed in stored mode, in which the public key to be used is retrieved from persistent storage 210, and the message is previously stored in ephemeral memory 220. Various configuration checks may be performed on the public key. If the configuration checks are successful, then the public key verification computation is performed and a Boolean value is returned as a result. Otherwise, an execution error is returned.

In some implementations, the instructions corresponding to verification may be used in validate mode. In this mode, the instructions are configured to validate a public key stored in persistent storage 210.

While only a few modules are shown in FIG. 2 and described in the previous sections, the instruction module 230 may include other cryptographic modules in addition to, or instead of, the modules described previously. For example, the instruction module 230 may include DeriveKey module, Lock module, PrivWrite module, Read module and Write module, apart from other modules.

The DeriveKey module is associated with instructions that are configured for combining the current value of a key with the nonce stored in ephemeral memory 220 using a hashing mechanism, such as SHA-256, and placing the result into a target location in persistent storage 210. The DeriveKey module instructions are configured to return an error if the target location already stores a private key, or the target location is locked, among other conditions.

The Lock module is associated with instructions that are configured for preventing future modification of the configuration zone and/or data and OTP page locations in persistent storage 210. In some implementations, the Lock module instructions may be used to lock individual data locations in persistent storage 210. Prior to performing the locking operations, the instructions may verify the integrity of the contents of the locations to be locked, for example using a cyclic redundancy check (CRC) algorithm.

The PrivWrite module is associated with instructions that are configured for writing cryptographic private keys into the persistent storage 210. The location in persistent storage 210 where a key is to be written is presented to the instructions as an input parameter.

The Read module is associated with instructions that are configured for reading contents from the persistent storage 210 or the ephemeral memory 220. The contents may be read as words, for example, as a 4-byte word or an 8-word block of 32 bytes. In some implementations, the data being read may be encrypted before being returned to the system.

The Write module is associated with instructions that are configured for writing data to the persistent storage 210. The data may be written as words, for example, as a 4-byte word or an 8-word block of 32 bytes. In some implementations, the data to be written may be encrypted prior to being sent to the secure device for writing to the persistent storage 210. This may be useful, for example, to prevent snooping on the bus during personalization or system operation. In some implementations, the instructions associated with the Write module may not be used to write cryptographic private keys. For such implementations, the cryptographic private keys may be written using instructions corresponding to the PrivWrite module, as described previously.

Figure 3:
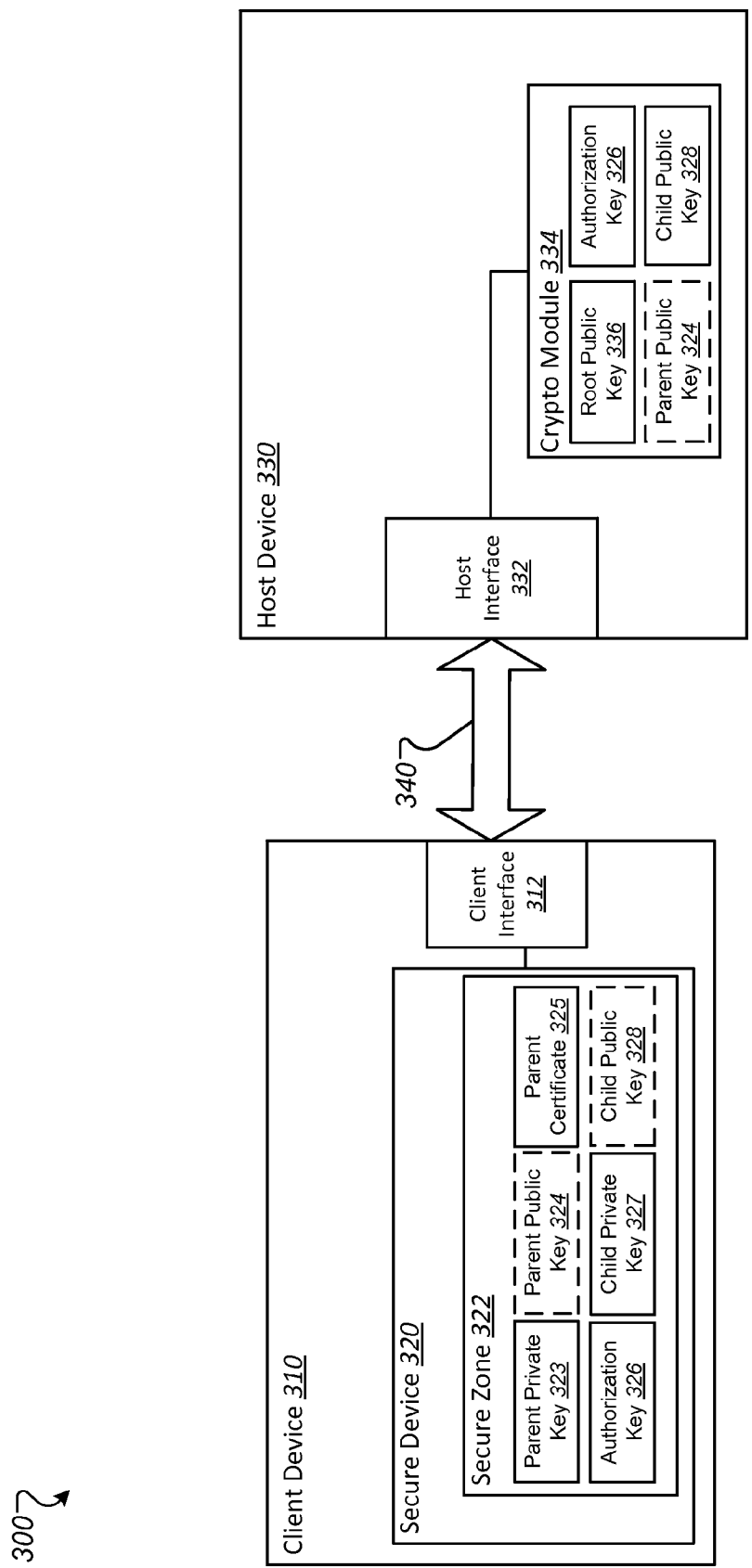
FIG. 3 illustrates an example of a system that may be used to generate cryptographic keys by a client device hardware that is coupled to a host device.

FIG. 3 illustrates an example of a system 300 that may be used to generate cryptographic keys by a client device hardware that is coupled to a host device. The system 300 also may be used to verify whether the host device is authorized to communicate with the client device. The system 300 includes a client device 310 that is coupled to a host device 330 using a connection 340. The client device 310 includes a secure device 320 and a client interface 312, apart from other components. The secure device 320 includes a secure zone 322 that houses one or more cryptographic keys and associated information, such as parent private key 323, parent public key 324, parent digital certificate 325, authorization key 326, child private key 327 and child public key 328. The host device includes, among other components, a host interface 332 and a cryptographic module 334 that stores one or more cryptographic keys and associated information, such as a root key 336, the authorization key 326 and the child public key 328.

The client device 310 is similar to the client devices previously described, such as the client device 100. For example, the client device 310 may be a daughter card that is connected to a motherboard. As another example, the client device 310 may be a printer cartridge inserted in a computer printer.

The client interface 312 is configured to enable the client device 310 to communicate with the host device 330. In some implementations, the client interface 312 may be a network interface that connects the client device 310 with a remote host device through a network. For example, the client interface 312 may include an Ethernet port, IEEE 802.11 chip, Bluetooth™ hardware, or a piece of software, such as software radio. In some other implementations, the client interface 312 may be an electrical interface that is configured to provide a physical coupling between the client device 310 and the host device 330. For example, the client interface 312 may be a Universal Serial Bus (USB) interface, external serial AT Attachment (eSATA) interface, IEEE 1394 (Firewire) interface, Thunderbolt interface, or a Lightning interface.

The secure device 320 is a hardware authentication device similar to the secure device 110. The secure device 320 is configured to provide cryptographic operations, such as secure storage, key generation and digital signature, to the client device 310. By providing services to the client device 310, the secure device 320 may facilitate strong security in the system 300. In some implementations, the secure device 320 may be a semiconductor chip, such as an IC chip, that is embedded in the client device 310 or externally coupled to the client device 310. In some other implementations, the secure device 320 may be implemented as a part of the client device hardware, such as flash memory or field programmable gate array (FPGA) in the client device 310.

The secure zone 322 is similar to the secure zone 120 or the secure zone 200. As described previously, the secure zone 322 may include: a persistent storage that is similar to the persistent storage 122 or the persistent storage 210; ephemeral memory is similar to the ephemeral memory 124 or the ephemeral memory 220; an instruction module that is similar to the instruction module 126, or the instruction module 230; and a processor or a digital processing element, such as the processor 112 or the processor 205.

In some implementations, one or more cryptographic keys are stored in the client device 310. The cryptographic keys are stored in the secure zone 322, either in the persistent storage, or in the ephemeral memory, or in a suitable combination of both. As described previously, the cryptographic keys may be stored in memory slots in the secure zone 322.

The cryptographic keys may be generated within the secure zone 322 using the security information and security tools that are available in the secure device 320. Alternatively, the cryptographic keys may be generated external to the secure device 320, for example by the vendor of the client device 310, who stores the keys in the secure device 320 before the client device 310 is deployed for use.

In some implementations, the cryptographic keys stored in the secure device 320 include a parent private key 323, which is part of an asymmetric private/public key pair. For example, the parent private key 323 may be based on Elliptic Curve Cryptography (ECC) tools, RSA algorithms, ElGamal system, or some other suitable asymmetric key system. The parent private key 323 is known only to the secure device 320 and is not visible to the outside world, such as the host device 330. The parent private key 323 may be generated by the vendor in the factory and stored in its predetermined memory slot in the secure zone 322 prior to use of the client device 310.

The cryptographic keys stored in the secure device may include the parent public key 324, which is generated based on the parent private key 323 using a suitable asymmetric key system as indicated above. In some implementations, the parent public key 324 is generated by the vendor in the factory and stored in its predetermined memory slot in the secure zone 322 prior to use of the client device 310. In some other implementations, the parent public key 324 is not stored in a predetermined memory slot in the secure zone 322. Instead, the parent public key 324 is regenerated from the parent private key 323 as needed, using the appropriate asymmetric key system.

The parent certificate 325 is a digital signature that is computed on the parent public key 324 and placed in its own predetermined memory slot in the secure zone 322. The digital signature may be generated by the vendor and stored in the secure zone 322 prior to use of the client device 310.

The parent certificate 325 is computed on the parent public key 324 using a suitable asymmetric key system, which may be the same asymmetric key system based on which the parent public key 324 is generated from the parent private key 323. Alternatively, the digital signature generated on the parent public key 324 may be based on an asymmetric key system that is different from the one used to generate the parent public key 324 from the parent private key 323.

In some implementations, the vendor uses a root private key to sign the parent public key 324 for generating the parent certificate 325. The root private key is a trusted asymmetric private key that is known only to the vendor, and may be based upon a suitable asymmetric key system, such as one of those described previously.

In such implementations, the vendor performs the role of a trusted Certificate Authority (CA) for all the client devices and host devices that are deployed by the vendor. Distinct parent private keys 323 may be stored in individual client devices 310 by the vendor. For each client device 310, the corresponding parent public key 324, which also may be distinct, is signed by the vendor using the root parent private key and the resulting parent certificate 325 is stored in its predetermined memory slot in the secure zone 322 of the secure device 320 that is embedded in the respective client device 310. The vendor shares the root public key associated with the root private key with host devices 330, such that a host device is able to verify the parent certificate 325 of a client device 310 with which the host device communicates.

In some implementations, the secure zone 322 stores an authorization key 326. The authorization key 326 may be a symmetric key used with a symmetric algorithm such as SHA-256 or Advanced Encryption Standard (AES), or the authorization key 326 may be an asymmetric key. The authorization key is a secret key that is not visible to the outside world. In addition to the secure device 320, the authorization key 326 is known to one or more host devices 330 that are authorized by the vendor to communicate with the client device 310 that embeds the secure device 320.

In some implementations, the secure device 320 is configured such that in order to use the parent private key 323, first an authorization has to be obtained by proving knowledge of the authorization key 326. For example, the KeyConfig 238 bit field corresponding to the parent private key 323 memory slot may be configured with the ReqAuth 239 set, and the AuthKey 240 pointing to the memory slot that stores the authorization key 326.

In some implementations, the secure zone stores a child private key 327, which is generated by the client device 310 within the secure zone 322, for example, using the GenKey module 236. The child private key 327 may be generated after the client device 310 has verified authorization of the host device 330 using the authorization key 326, and upon receiving instructions from the host device 330. The child private key 327 may be based on a suitable random number generated using the RandGen module 232.

The secure zone 322 also may store a child public key 328, which is generated based on the child private key 327 using a suitable asymmetric key system, such as one of those described in the preceding sections. The child public key 328 may be generated by the secure device 320 using the GenKey module 236, and stored in its predetermined memory slot in the secure zone 322. However, in some implementations, the child public key 328 is not stored in a predetermined memory slot in the secure zone 322. Instead, the child public key 328 is regenerated from the child private key 327 as needed, using the appropriate asymmetric key system.

As indicated previously and described in greater detail in the following sections, the cryptographic keys stored in the secure zone 322 may be used by the client device 310 to verify whether a host device 330 is authorized to communicate with the client device. When a host device 330 is verified as authorized, the cryptographic keys may be used to establish a trusted relationship between the client device 310 and the host device 330. As part of establishing the trusted relationship, the host device also may verify that the client device knows the child private key that is used for signing messages sent by the client device.

In this context, a host device 330 being authorized indicates that the client device 310 will accept as correct messages that are sent from the host device. The messages may include instructions for the client device 310 to perform some operations, and the client device 310 is configured to perform the operations based on instructions sent from an authorized host device 330. A trusted relationship indicates that a message sent from the client device 310 to the host device 330 is signed by the client device 310 using a cryptographic key stored in the secure device 320, such as the child private key 327. Upon receiving the message, the host device 330 may authenticate the message by checking the signature on the message, using the child public key 328 corresponding to the child private key 327. The child public key 328 may be sent from the client device to the host device 330 after the authorization of the host device 330 is verified.

Although only a few components are shown for the client device 310, there may be other components and modules included in the client device in addition to, or instead of, the client interface 312, the secure device 320, or both.

The host device 330 is similar to the host devices previously described. For example, the host device 330 may be a motherboard that has a daughter card connected to it as a client device. As another example, the host device may be a computer printer that includes a printer cartridge as the client device.

The host interface 332 is configured to enable the host device 330 to communicate with the client device 310. In some implementations, the host interface 332 may be a network interface that connects the host device 330 with a remote client device through a network. For example, the host interface 332 may include an Ethernet port, IEEE 802.11 chip, Bluetooth™ hardware, or a piece of software, such as software radio. In some other implementations, the host interface 332 may be an electrical interface that is configured to provide a physical coupling between the host device 330 and the client device 310. For example, the host interface 332 may be a Universal Serial Bus (USB) interface, external serial AT Attachment (eSATA) interface, IEEE 1394 (Firewire) interface, Thunderbolt interface, or a Lightning interface.

The crypto module 334 may be a piece of hardware (such as an IC chip) or software (such as software libraries) embedded in non-transitory memory on the host device, or a combination of hardware and software. The crypto module 334 provides utilities for performing cryptographic operations to facilitate secure communication of the host device 330 with the client device 310.

In some implementations, the crypto module 334 stores one or more cryptographic keys, for example in memory slots configured in persistent storage in the crypto module 334. The cryptographic keys include a root public key 336 that is the public key corresponding to the root private key used by the vendor to sign the parent certificate 325. The host device 330 trusts the vendor as the CA, and therefore the root public key 336 is a trusted key. The vendor may store the root public key 336 in the crypto module 334 prior to deployment of the host device 330, such that subsequently, while establishing communication with a client device 310, the host device 330 is able to verify the parent certificate 325 of the client device 310 using the root public key 336.

In some implementations, different vendors may use distinct root private/public key pairs for configuring their respective client and host devices. For example, vendor A may use root private key A for generating the parent certificate 325 associated with client devices deployed by vendor A, and store the corresponding root public key A in host devices 330 deployed by vendor A. The root private key A may be known only to vendor A and consequently the root private/public key pair A can be used only by vendor A in signing digests for certificates. A different vendor B may use a different root private/public key pair B in configuring client and host devices that are associated with vendor B. Therefore, when an attempt is made to couple a client device B, which is deployed by vendor B, to a host device A that is deployed by vendor A, host device A may not be able to authenticate the parent certificate provided by client device B, since the parent certificate is signed with root private key B, while the root public key 336 stored in host device A is root public key A. Accordingly, by using different root private/public key pairs, different vendors may limit the host devices to connect to their respective client devices, and vice versa.

In some implementations, the crypto module 334 stores the authorization key 326, which may be preloaded in the host device 310 by the vendor prior to deployment of the host device 330. As indicated previously, different categories of client devices 310 or client devices 310 from different vendors may have their unique authorization keys. The vendor may store in the host device 330 one or more authorization keys 326 that correspond to those client devices 310 with which the host device 330 is authorized to communicate by the vendor. For example, all blue printer cartridges from vendor A may share an authorization key that is different from the authorization key shared by all red printer cartridges from vendor A. An inkjet printer deployed by vendor A may be preloaded with several authorization keys 326 for the different colors of a particular model of inkjet cartridges (such as, red and blue cartridges as above) manufactured by vendor A that the inkjet printer may use. However, vendor A may not load the inkjet printer with authorization keys 326 corresponding to a different model of printer cartridges from vendor A that is meant for a different printer model. Consequently, the inkjet printer may prove its authorization to only the red and blue inkjet cartridges with which the inkjet printer shares authorization keys, but the printer will not be able to prove authorization with the different model of printer cartridges with which it does not share authorization keys. Thus, vendor A may limit different models of printers to use different models of printer cartridges.

The authorization keys associated with inkjet printer cartridges manufactured by vendor B may be different from the ones stored in the inkjet printer above. Therefore, if an inkjet cartridge from vendor B is inserted in the inkjet printer from vendor A, the printer will not be successfully authorized to the vendor B inkjet cartridge, and consequently the inkjet cartridge from vendor B cannot be used in the printer from vendor A.

The crypto module 334 also may store the parent public key 324. The client device 310 may send the parent public key 324, along with the parent certificate 325, to the host device 330 after the authorization of the host device is verified through a challenge response mechanism using the authorization key 326, as indicated previously and discussed in greater detail in the following sections.

The host device 330 verifies authenticity of the parent public key 324 by verifying the parent certificate 325 using the root public key 336. In this context, verifying the authenticity of the parent public key 324 indicates that the parent public key 324 is verified to be tied to a known identity of the client device 310 based on information included in the parent certificate 325. The parent certificate is signed by the root private key. Since the host device 330 stores the trusted root public key 336, the host device 330 can confirm that the parent certificate 325 is indeed signed by the CA using the root public key 336.

Once the parent public key 324 is verified as authentic, the host device 330 may store the parent public key 324 in the crypto module 334. Subsequently, when other cryptographic keys or messages are received from the client device 310 that are signed and/or encrypted using the parent private key 323, the host device 330 can confirm that they are generated by the client device 310 by checking the signature and/or decrypting the message using the parent public key 324.

The crypto module 334 also may store the child public key 328. The client device 310 may send the child public key 328 to the host device 330 after receiving instructions from the authorized host device 330 to generate a child private/public key pair. Based on the instructions, the client device 310 generates the child private key 327 and corresponding child public key 328, and sends the child public key 328 to the host device 330.

In some implementations, the client device 310 may send the child public key 328 along with a signature on the child public key 328 that is signed with the parent private key 323 to prove its authenticity. The host device 310 can verify the signature on the child public key 328 using the parent public key 324. If the signature is verified, the host device 330 can accept the child public key 328 as coming from the client device 310. Then the host device 330 may store the child public key 328 in the crypto module 334.

In some implementations, before the host device accepts subsequent communications from the client device 310 that are signed using the child private key 327, the host device may verify that the client device knows the child private key 327 that correspond to the child public key 328 stored in the crypto module 334. Such verification may be useful, for example, in cases where a new communication session is initiated between the host device and the client device after a time interval since the communication during which the host device 330 received the child public key 328 from the client device 310. The verification may help to prevent replay attacks that are launched by unauthorized client devices.

The verification may be performed using a challenge-response mechanism, in which the host device 330 generates a challenge that is sent to the client device 310 in a message. The client device 310 responds with a signed version of the challenge that is signed with a private key known to the client device. The host device checks, using the child public key 328 stored in the crypto module 334, whether the signature on the challenge has been generated using the child private key 327. If the signature is verified to have been generated using the child private key corresponding to the child public key 328 known to the host device 330, then the host device 330 accepts that the client device 310 is in possession of the correct child private key 327.

The connection 340 is configured for coupling the client device 310 to the host device 320. In some implementations, where the client device and the host device are remote to one another, the connection 340 may be a network connection. For example, the connection 340 may be through a circuit-switched data network, a packet-switched data network, a Local Area Network (LAN), or any other network able to carry data, for example, Internet Protocol (IP)-based or asynchronous transfer mode (ATM)-based networks, including wired or wireless networks. In some other implementations, where the client device and the host device are most closely placed, the connection 340 may be a data cable. In yet other implementations, where the client device and the host device are physically coupled, the connection 340 may be a hardware interface, such as a PCI interface on a motherboard.

Although the system 300 shows a host-client configuration with the secure device 320 included in the client device 310, other configurations are also possible. For example, the secure device 320 may external to the client device 310, but coupled to the latter through a suitable interface. Similarly, the crypto module 344 may be external to the host device 330, but coupled to the latter using a suitable interface. Such a configuration may allow a client device 310 and/or a host device 330, which are not pre-configured with appropriate security features similar to the secure device 320 or the crypto module 334 as the case may be, to communicate with each other securely using the device authorization and key generation and storage mechanisms described in the preceding sections.

Although the system 300 shows a host-client configuration with a single client device 310, other configurations are also possible. For example, the system 300 may include multiple client devices 310 that are connected to a single host device 330. In some implementations, the connection 340 may be shared among the multiple client devices 310, or the connection 340 may be replicated for each client device 310 connected to the host device 340.

Figure 4:
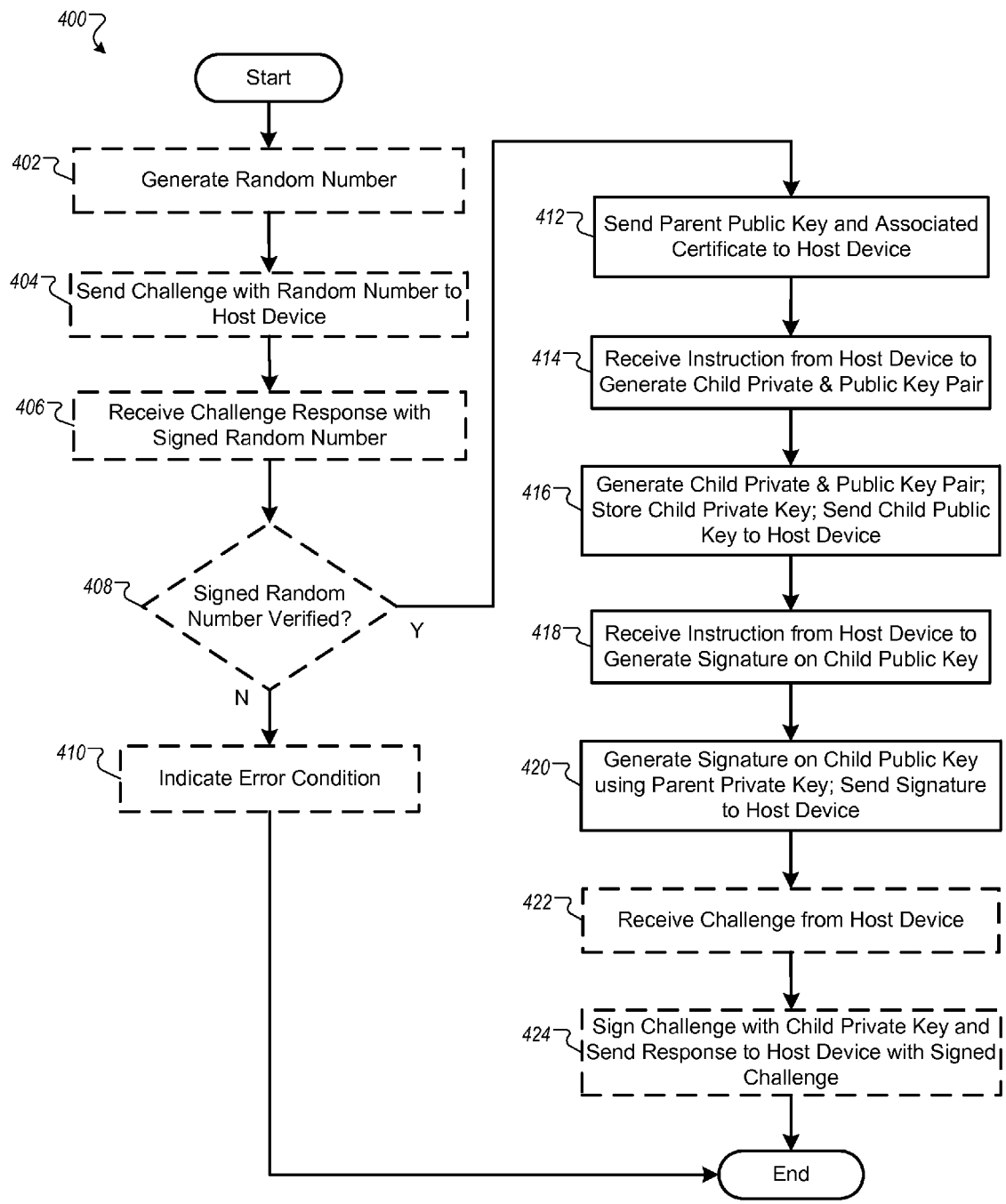
FIG. 4 is a flow chart illustrating an example of a process by which a client device may generate cryptographic keys using secure hardware for communication with a host device.

FIG. 4 is a flow chart illustrating an example of a process 400 by which a client device may generate cryptographic keys using secure hardware for communication with a host device. The process 400 also may be used to verify authorization of the host device to communicate with the client device. The process 400 may be performed by a client device that includes a secure device, such as secure device 320, for generating cryptographic keys in hardware and storing the cryptographic keys. For example, the process 400 may be performed using the client device 310 in the system 300. Accordingly, the following section describes the process 400 as being performed by components of the system 300. However, the process 400 may be performed by other circuits, systems or system configurations.

The process 400 is performed by the client device as part of an initial secure exchange with the host device. For example, based on instructions from the host device, the client device generates a child private/public key pair that are used to authenticate messages sent from the client device to the host device. The client device authenticates the generated cryptographic keys using a parent private key stored in the client device, such as the parent private key 323.

In some implementations, the client device is configured such that, before the child private/public key pair is generated, the host device proves that it is authorized to send instructions to the client device. For example, ReqAuth 239 in the KeyConfig 238 bit field corresponding to the parent private key 323 is set, and the associated AuthKey 240 map to the address of the memory slot in the secure zone 322 that stores the authorization key 326. Therefore, the authorization of the host device can be verified by having the host device prove that it is in possession of the authorization key 326. The host device authorization is performed through a challenge-response message exchange between the client device and the host device.

The client device generates a random number (402). For example, the client device 310 generates a random number using the RandGen module 232. The random number may be generated using the secure device 320, for example, in the secure zone 322.

The client device sends a challenge with the random number to the host device (404). For example, the client device 310 sends a message to the host device 330 that includes the newly-generated random number as part of the message.

The client device receives a challenge response with the signed random number (406). For example, the client device 310 receives a message from the host device 330 in response to the challenge message that was sent to the latter. The message from the host device 330 includes a version of the random number that is signed with a cryptographic key.

The client device checks whether the random number signature is verified (408). For example, the client device 310 computes a keyed hash on the random number it generated using the authorization key 326 that is stored in the secure zone 322. The client device 310 compares the computed keyed hash with the signed version of the random number received from the host device 330 and determines whether there is a match.

If the keyed hash does not match the signed version of the random number, then the signed random number received from the host device 330 is not verified. In such a case, the client device 310 cannot confirm that the host device 330 possesses the authorization key 326, and therefore cannot confirm that the host device 330 is authorized to send instructions to the client device. This indicates an error condition (410). In some implementations, the client device 310 sends an error message to the host device 330 and asks the host device to re-send the challenge response with a recomputed signed random number, or terminate the transaction. In some other implementations, the client device 310 terminates the transaction without sending any message to the host device 330.

As indicated previously, (402), (404), (406), (408) and (410) are used in implementations where the host device has to prove that it is authorized, before a child private/public key pair is generated by the client device. Therefore, (402), (404), (406), (408) and (410) may be considered as optional, which is indicated in FIG. 4 by the dotted boundaries for (402), (404), (406), (408) and (410).

Referring back to (408), if the keyed hash matches the signed version of the random number, then the signed random number received from the host device 330 is verified. This indicates that the host device 330 has signed the random number using the same authorization key known to the client device 310. Consequently, the host device 330 is verified as being authorized to send instructions to the client device 310. Then the client device 310 may set the bits in the ReqAuth field 239 in the KeyConfig 238 bit field associated with the parent private key 323, indicating that the authorization of the host device has been proven using the authorization key pointed to by the AuthKey 240.

The process of proving authorization of the host described in the preceding section is an example of using symmetric cryptography for authorization. In some implementations, the authorization of the host may be verified using asymmetric cryptography, for example, by a challenge-response mechanism using a private/public key pair. In such implementations, the host device 330 may be in possession of a private key and the corresponding public key is stored in a client device 310 that is intended to communicate with the host device 330. The client device 310 verifies that the host device is authorized through a challenge-response message exchange as in the symmetric case.

The client device sends a challenge (for example, a nonce) to the host device. Subsequently, the client device receives a response from the host device with the signature on the challenge (406) that is signed with a private key known to the host device.

The client device checks whether the signature has been generated using the private key corresponding to the public key that is stored at the client device. If the client device determines that there is a match, then the host device 330 is verified as being authorized to send instructions to the client device 310.

When the authorization of the host device is verified, the client device sends the parent public key and the associated certificate to the host device (412). For example, the client device 310 sends the parent public key 324 and the parent certificate 325 to the host device 330.

Then the client device receives an instruction from the host device to generate a child private/public key pair (414). For example, the client device 310 receives a message from the host device 330 that includes instructions for the client device 310 to generate a child private/public key pair.

The client device generates a child private/public key pair; stores the child private key; and sends the child public key to the host device (416). For example, the client device 310 generates a private key 327 based on an appropriate random number and a corresponding child public key 328, using instructions from the GenKey module 236 in the secure device 320. The client device 310 stores the child private key 327 in a predetermined memory slot in the secure zone. The child private key 327 is known only to the client device 310; it is not shared with any other device. The client device 310 generates a digest of the child public key 328, for example using the GenDig module 242, and stores the digest in temporary memory, such as ephemeral memory in the secure device 320. The client device 310 sends a copy of the child public key 328 to the host device 330.

After sending the child public key to the host device, the client device receives an instruction from the host device to generate a signature on the child public key (418). For example, in response to sending the child public key 328 to the host device 330, the client device 310 receives a message from the host device that directs the client device to sign the digest of the child public key 328 using the parent private key 323.

The client device generates a signature on the child public key using the parent private key, and sends the signature to the host device (420). For example, the client device 310 computes a digital signature, using the parent private key 323, on the digest of the child public key 328. The client device 310 may use instructions from the Sign/Verify module 244 to compute the digital signature. The client device 310 sends the computed digital signature to the host device 330.

In some implementations, the client device generates the child private/public key pair and the signature on the child public key without receiving separate instructions from the host device. For example, the client device may compute the signature on the child public key automatically following generating the child public key. Subsequently the client device may send the child public key and the associated signature together to the host device. In such implementations, the client device does not need to receive instructions from the host device to generate signature on the child public key (418).

In some implementations, the signature generated on the child public key 328 may include state information corresponding to the secure device 320. The state information may include configuration information associated with the location in persistent storage used for storage of the child public or private keys, chip state information and command parameters. The secure device 320 may include a sensor, in which case the secure device may use a sensor reading as part of the digest on which the signature is generated.

In some implementations, the initial secure exchange is completed at this stage, and the client device can subsequently exchange data with the host device that is authenticated and/or encrypted using the child private/public key pair. However, in other implementations, the client device may receive a challenge from the host device (422). For example, after sending the signature on the child public key to the host device, the client device 310 may receive a message from the host device 330 that includes challenge (for example, a nonce or some other random number). As described previously, the host device may send the challenge to the client device to prove that the client device is in possession the child private key corresponding to the child public key. This may be useful in preventing replay attacks, among other uses.

Upon receiving the message from the host device, the client device signs the challenge with the child private key and sends a response to the host device with the signed challenge (424). For example, the client device 310 may extract the challenge number from the message sent by the host device 330, generate a digest on the challenge and sign the digest using the child private key 327. Then the client device 310 sends a response to the host device 330 that includes the signature generated with the child private key 327. The host device 330 can subsequently verify the signature using the child public key 328.

The client device may combine state information or other configuration parameters corresponding to the secure device 320 with the digest and generate the signature on the combination of the digest and the state information. Combining the state or other configuration information may provide additional security, since they help to verify that the signature was generated by an entity with access to the physical characteristic information of the secure device 320.

In some implementations, the use of the parent private key and/or the child private key to sign an arbitrary digest may be constrained in order to provide confidence that the digest signed by the respective key corresponds to an internal state, configuration, or secrets stored in the secure zone 322. For example, the secure device 320 may restrict the use of the signing key to situations where the digest is generated by the internal circuitry. The secure device 320 may achieve this by tracking the state information associated with values stored in either persistent storage or in ephemeral memory.

In some implementations, the secure device 320 may restrict the way in which a signature is calculated in order to provide a differentiation between a signature of an internally generated digest and an externally provided digest. For example, the format of the hashed data may include state bits that track the details of the digest calculation process. In addition, the command information for the instructions associated with the Sign operation may tracked in the generated digest. Alternatively, or in addition, the processing of the digest to create the actual input number to the asymmetric algorithm may be different when signing an internal digest compared to the case when signing an external digest. For example, in some implementations, the GenKey module 236 may be used for signing internal digests, while the GenDig module 242 may be associated with signing externally provided digests.

(422) and (424) are used in implementations where the host device verifies that the client device is in possession of the child private key corresponding to the child public key that is known to the host device. Therefore, (422) and (424) may be considered as optional, which is indicated in FIG. 4 by the dotted boundaries for (422) and (424).

Figure 5:
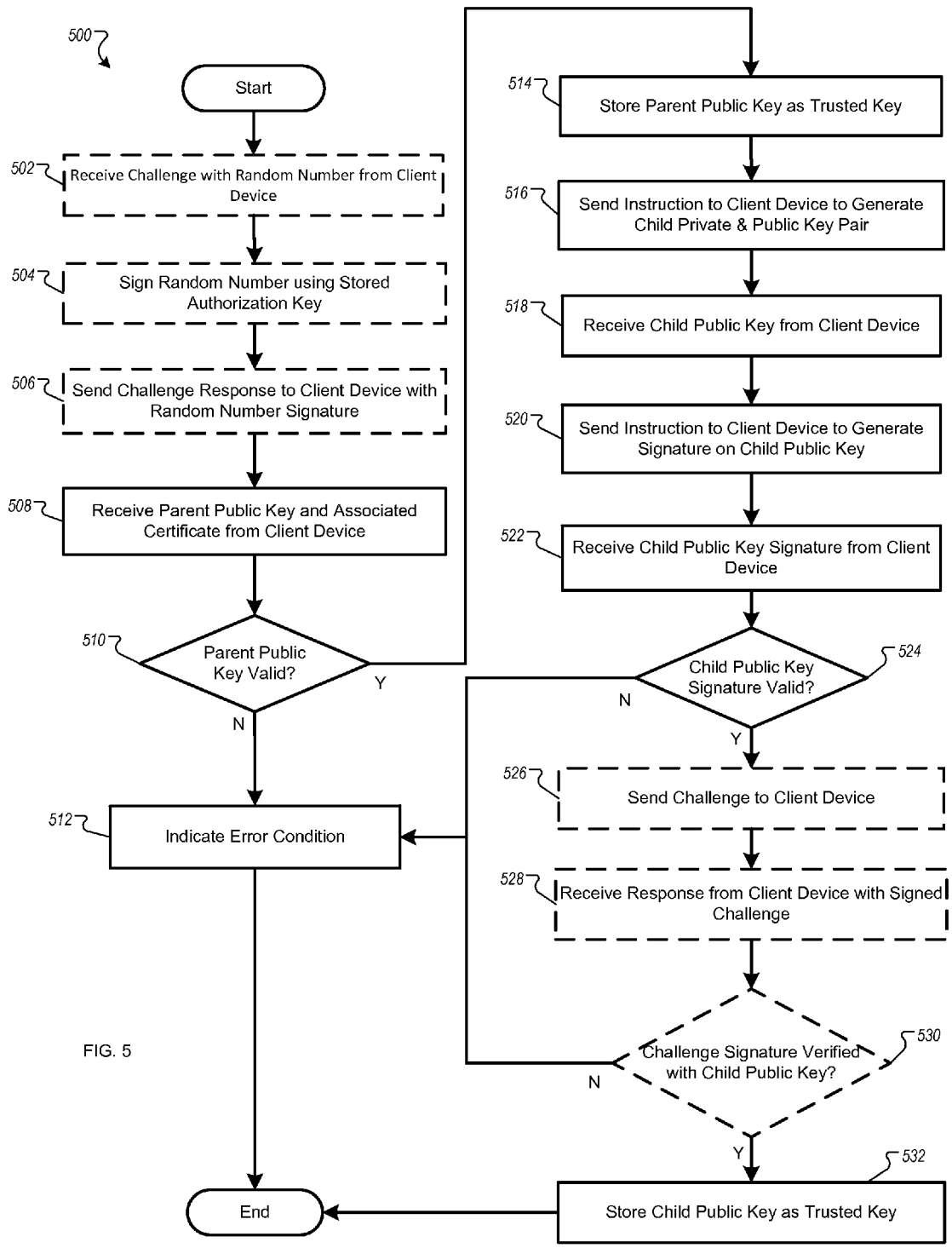
FIG. 5 is a flow chart illustrating an example of a process by which a host device verifies cryptographic keys sent from a client device.

FIG. 5 is a flow chart illustrating an example of a process 500 by which a host device verifies cryptographic keys sent from a client device. The process 500 also may be used to authorizes the host device to the client device. The process 500 may be performed by a host device communicating with a client device that includes a secure device, such as secure device 320, for secure storage and signature. For example, the process 500 may be performed by the host device 330 in the system 300. Accordingly, the following describes the process 500 as being performed by components of the system 300. However, the process 500 may be performed by other circuits, systems or system configurations.

The process 500 may be performed by the host device as part of an initial secure exchange with the client device. For example, the host device verifies to the client device that the former is authorized to send instructions to the latter. Upon verification, the host device sends instructions to the client device to generate a child private/public key pair for securing subsequent message exchange between the client and host devices. The host device receives the generated child public key from the client device and authenticates the child public key before the subsequent message exchange. In this context, the process 500 describes host device operations that are performed in tandem with the client device operations described by the process 400.

As part of the process 500, in some implementations the host device receives a challenge with a random number from the client device (502). For example, the host device 330 receives a message from the client device 310 that includes a random number generated by the client device 310. The random number may be generated using the secure device 320, such as by the RandGen module 232.

The host device signs the random number using the stored authorization key (504). For example, the host device 330 signs the random number received from the client device 310 using the authorization key 326 that is stored in the crypto module 334.

The host device sends a challenge response to the client device with the random number signature (506). For example, the host device 330 sends a response to the client device 310, which includes a version of the random number received from the client device 310. The version of the random number included in the response is signed with the authorization key 326.

As indicated previously, (502), (504) and (506) are used in implementations where the host device has to prove that it is authorized before a child private/public key pair is generated by the client device. Therefore, (502), (504) and (506) may be considered as optional in some implementations, which is indicated in FIG. 5 by the dotted boundaries for (502), (504) and (506).

The host device receives a parent public key and associated certificate from the client device (508). For example, the host device 330 receives the parent public key 524 and the parent certificate 525 from the client device 310, where the corresponding parent private key 323 is stored in the secure zone 322 of secure device 320.

In some implementations, the host device sends an instruction to the client device that directs the client device to generate the parent public key from the parent private key, and send the parent public key to the host device. This may be the case, for example, when a copy of the parent public key is not stored in the client device.

In some implementations, the host device may receive only the parent public key from the client device, and not the accompanying certificate. In such implementations, upon receiving the parent public key, the host device reads the associated certificate that is stored in the secure device embedded in the client device. For example, the host device 330 may send an instruction to the client device 310 asking for a copy of the parent certificate 325 stored that is stored in the secure zone 322 of the secure device 320.

Upon receiving the parent public key, the host device verifies whether the parent public key is valid (510). For example, the host device 330 checks whether the received certificate 325 is generated by the trusted CA. The host device 330 uses the root public key 336 to verify the authenticity of the certificate, since the trusted CA (that is, the vendor associated with the host device 330) would use the corresponding root private key to sign the certificate. The certificate 325 binds the received parent public key 324 to the client device 310. Therefore, if the authenticity of the certificate 325 is verified, then the host device 330 can accept the root public key 324 as valid.

If the certificate cannot be verified as authentic, then the host device does not accept the parent public key as valid. This indicates an error condition (512). In some implementations, the host device 330 may send an error message to the client device 310, asking the client device to re-send the parent public key 324 and the parent certificate 325, or terminate the transaction. In some other implementations, the host device 330 may terminate the transaction without sending any message to the client device 310.

On the other hand, if the certificate is successfully verified, then the host device accepts the received parent public key as valid. The host device stores the parent public key as a trusted key (514). For example, the host device 330 stores the parent public key 324 in the crypto module 334.

Then the host device sends an instruction to the client device to generate a child private/public key pair (516). For example, when the parent public key 324 is verified as valid, the host device 330 sends an instruction to the client device 310, directing the client device to generate a child private/public key pair that may be used for securing future communication from the client device 310 to the host device 330.

The host device receives a child public key from the client device (518). The child public key may be part of the child private/public key pair generated by the client device following the directive received from the host device. For example, the host device 330 receives the child public key 328 from the client device 310. The host device 330 caches the child public key 328 locally till the key can be verified.

The host sends an instruction to the client device to generate a signature on the child public key (520). For example, the host device 330 sends a message to the client device 310 directing the client device to sign a digest of the child public key 328 that is stored in the client device, for example, in the ephemeral memory in the secure device 320.

The host device receives a child public key signature from the client device (522). For example, subsequent to sending the message to the client device 310 directing the client device to sign a digest of the child public key 328, the host device 330 receives a message from the client device 310 that includes a signature on the child public key 328. The signature may have been generated by the client device 310 signing the digest of the child public key 328 stored in ephemeral memory in the client device.

In some implementations, the host device receives the child public key and the associated signature at the same time from the client device. This may be the case, for example, when the client device generates the child private/public key pair and the signature on the child public key automatically, without receiving separate instructions from the host device. In such implementations, the host device does not need to send separate instructions to the host device to generate signature on the child public key (520).

The host device checks whether the child public key signature is valid (524). The child public key may be signed by the client device using the parent private key, and the host device can verify the signature using the parent public key that is stored at the host device. For example, the host device 330 can verify the signature on the child public key 328 using the parent public key 324 and consequently verify the child public key. In some implementations, the host device 330 decrypts the child public key signature received from the client device 310 using the locally-stored copy of the parent public key 324, and obtains the digest. The host device 330 locally computes a new digest based on the cached copy of the child public key 328, along with state and/or configuration information associated with the secure device 320 that may have been received from the client device 310.

If the child public key signature is not valid, then an error condition is indicated (512). For example, if the signature computed by the host device 330 using the locally stored parent public key does not match the signature received from the client device 310, then the child public key received from the client device cannot be verified as valid. In such an event, the host device 330 acts in a manner similar to that described previously with respect to the indication of the error condition (512).

On the other hand, if the signature on the child public key received from the client device is verified as valid, then the host device may store the child public key as a valid key. For example, the host device successfully verifies the received child public key 328 as valid if the new digest matches the digest that is obtained by decrypting the received signature as described above. Thus, the host device 330 can verify the child public key 328 received from the client device 310.

In some implementations, the host device may perform a further challenge response to verify that the client device it is currently communicating with is in possession of the child private key corresponding to the recently-validated child public key. The host device sends a challenge to the client device (526). For example, the host device 330 generates a random number and sends a message that includes the random number to the client device 310.

The host device receives a response from the client device with a signed challenge (528). For example, the host device 330 receives a response to the challenge message that it sent to the client device 310. The response message includes a signature on the random number that was generated by the host device.

The host device determines whether the challenge signature can be verified with the child public key (530). For example, the host device 330 checks whether the signature on the random number that is received from the client device can be verified with the child public key 328. If the child public key cannot verify the signature, then an error condition is indicated (512).

On the other hand, if the challenge signature received from the client device is verified using the child public key, then the host device stores the child public key as a trusted key (532). For example, if the host device 330 can successfully verify the random number signature using the child public key 328, then the host device can confirm that the client device with which it is currently communicating is in possession of the child private key corresponding to the child public key 328. Consequently, the host device 330 stores the child public key 328 as a trusted key, that is, the child public key 328 has been generated by the secure device 320 embedded with the client device 310 and which is associated with the parent public/private key pair previously authenticated based on the root public key 336. In such an event, the host device 330 stores the child public key 328 as a trusted key, for example, in the crypto module 334.

(526), (528) and (530) are used in implementations where the host device uses a challenger-response mechanism to verify that the client device is indeed in possession of the child private key corresponding to the child public key that is known to the host device. Therefore, (526), (528) and (530) may be considered as optional in some implementations, which is indicated in FIG. 5 by the dotted boundaries for (526), (528) and (530).

The initial secure exchange is completed at this stage. Subsequently, the host device 330 may authenticate messages sent by the client device 310 that has been signed by the child public key 328, that is, accept that the information in the message has been generated by the client device 310. The host device 330 also may use the child public key 328 to decrypt and read communication that has been encrypted by the client device 310 using the child private key 327.

As described in the preceding sections, a client device may use embedded secure hardware to check authorization of a host device to which the client device is connected, and accordingly generate cryptographic keys for secure communication between the two devices. The client device may include information on the state or configuration of the secure device in generating the cryptographic keys and/or computing signatures on the generated keys and messages. Thus, the secure device may provide robust security that is tied to the characteristics of the signing entity. ECC may be used as the basis of the asymmetric cryptographic scheme for generating the cryptographic keys and the signatures. However, other asymmetric cryptographic mechanisms also may be used, for example, the RSA public-key algorithm. In addition, different curves may be used with ECC, and signature schemes different from ECEDSA may be used, such as Digital Signature Algorithm (DSA) or Schnorr signature, or some other suitable mechanism.

In some implementations, the security provided by the secure device may be varied by implementing policy restrictions on the use of the signing key, for example by including identity information such as biometrics. The digests that are generated by the secure device may be implemented using programmable generation schemes, instead of fixed computation. In addition, the computations of the cryptographic keys may include usage properties of the keys as an alternative, or in addition to using the location in persistent storage where the keys are stored. In some implementations, the child private/public key pair may be regenerated after a certain time period, based on the applicable the security policy.

By using a secure device to generate cryptographic keys as described in the preceding sections, manufacturing cost may be reduced because some keys, such as the child private/public key pair, may be generated after manufacturing. In some implementations, some certificates/signatures and the device authorization key can be generated at a time subsequent to device personalization at the manufacturing site. In such implementations, there may not be a requirement to store securely the root private key at the manufacturing site, which may reduce manufacturing complexity. Since the cryptographic keys may be generated by the client device after leaving the manufacturing site, the root private key may be stored elsewhere (for example, on an Internet server). Since the child public key can be generated by the client device at the end use site, concerns about privacy or security of factory-generated cryptographic keys may be resolved.

By using a hierarchy of trusted keys, such as the root private/public key pair, the parent private/public key pair and the child private/public key pair, individual entities can be provided with keys that only they can use. This associates only that key with that particular entity.

In some implementations, the client device can be restricted to work with a single host device at a time. This may be achieved by storing the device child public key in the host memory. If the client device is transferred to a new host device, the relationship to the old host device will be eliminated preventing simultaneous use with two host devices. The new host device would have to instruct the client device to generate new child private/public keys, which would be unknown to the old host device. In addition, if a child public key were compromised in any way, the key would be not accepted by a different host device since that new host device would require that the client device generate a new child private/public key pair.

In some implementations, the client device can be restricted to work with only one host device, and prevented from working with any other host device. This may be achieved by configuring the client device such that the child public key is restricted to being generated once via a counter mechanism.

In some implementations, using the authorization key facilitates limiting the generation of child private/public key pair to a certain number of times. If the authorization key was not required, then an adversarial host device could instruct the client device to generate child private/public key pair many times until the key use counter is exhausted, thereby denying further use of that child key. With the authorization mechanism, an unauthorized attacker would not be able to mount this attack, since the attacker will not possess the authorization key to verify with the client device.

In some implementations, the security of a cryptographic key is related to the number of times the key is used. In such implementations, limiting the use of a cryptographic key by requiring that the host device be authorized enhances the security of the key. An attacker cannot instruct the client device to generate the child private/public key pair at all if the attacker cannot obtain the required authorization.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
    authenticating, by a client device, a host device that is coupled to the client device by verifying by the client device a signature generated by the host device using a cryptographic authentication key that is known to the client device and the host device;
    in response to authenticating the host device, setting a parameter in a secure device associated with the client device;
    based on setting the parameter in the secure device, sending, by the client device and to the host device, a parent public key and a certificate associated with the parent public key, wherein the parent public and private keys are cryptographic keys, and the certificate is a cryptographic certificate that is generated by a certificate authority trusted by the host device and the client device prior to deployment of the client device, wherein the parent private and public key pair and the certificate are stored in a persistent storage included in the secure device prior to deployment of the client device, and wherein the parent public key is verified by the host device using a root public key associated with the certificate authority, the root public key stored in the host device prior to deployment of the host device;
    receiving, at the client device, instructions from the host device for generating a child private and public key pair;
    in response to receiving the instructions, generating, by the client device, a child private key based on a first random number produced within the secure device, and a child public key associated with the child private key, wherein the child private and public keys are cryptographic keys that are generated within the secure device;
    computing, by the client device, a first signature on the child public key using the parent private key, wherein the first signature is a cryptographic signature and computing the first signature comprises:
        combining, using the secure device, a nonce with the child public key to generate a digest;
        combining the digest with information associated with the secure device; and
        generating, by the secure device, the first signature by performing an asymmetric cryptographic signature computation, using the parent private key, on the combination of the digest and the information associated with the secure device; and
    sending, by the client device, the child public key and the first signature to the host device.

2. The method of claim 1, wherein the information associated with the secure device includes at least one of state information of the secure device, key storage configuration information, key storage state information and command parameters.

3. The method of claim 1, wherein setting the parameter in the secure device comprises:
    setting a bit included in the secure device indicating that the host device has been authenticated, wherein the bit is associated with the parent private key.

4. The method of claim 3, wherein sending the parent public key and the certificate associated with the parent public key to the host device based on setting the parameter in the secure device comprises:
    determining whether the bit is set in the secure device; and
    in response to determining that the bit is set in the secure device, sending the parent public key and the certificate associated with the parent public key to the host device, and generating the child private key.

5. The method of claim 1, comprising:
    receiving, at the host device, the parent public key and the certificate associated with the parent public key from the client device;
    verifying, by the host device, validity of the parent public key by checking the signature on the certificate using the root public key;
    based on verifying the parent public key as valid, sending instructions from the host device to the client device, the instructions directing the client device to generate the child private and public key pair;
    in response to sending the instructions, receiving, at the host device, the child public key and the first signature; and
    verifying, by the host device, validity of the child public key by verifying correctness of the first signature using the verified parent public key.

6. The method of claim 1, wherein a copy of the authentication key is stored in the persistent storage included in the secure device, and wherein authenticating the host device by the client device comprises:
    sending, by the client device, a first cryptographic challenge to the host device, wherein the first cryptographic challenge is sent for authenticating the host device;
    receiving, at the client device, a response to the first cryptographic challenge, the response including an initial signature associated with the first cryptographic challenge that is signed with the authentication key available to the host device;

verifying, by the client device, correctness of the initial signature using the copy of the authentication key stored in the persistent storage included in the secure device; and authenticating, by the client device, the host device based on verifying the correctness of the initial signature.

7. The method of claim 6, comprising:

receiving, at the host device, the first cryptographic challenge from the client device;

accessing, by the host device, the authentication key that is available to the host device;

computing, by the host device, the initial signature on the first cryptographic challenge using the authentication key; and sending, by the host device, the initial signature to the client device.

8. The method of claim 1, comprising:

receiving, at the client device and from the host device, a message including a second cryptographic challenge;

computing, by the client device, a second signature on the second cryptographic challenge using the child private key generated by the client device; and sending, by the client device and to the host device, a response to the cryptographic challenge, the response including the second signature.

9. The method of claim 8, comprising:

sending, by the host device, the second cryptographic challenge to the client device;

receiving, at the host device, a response to the second cryptographic challenge including the second signature;

verifying, by the host device, correctness of the second signature using the child public key that is received from the client device; and based on verifying correctness of the second signature, storing, by the host device, the child public key as a trusted key.

10. A system comprising:

a first processor; and first instructions encoded in a non-transitory machine-readable first medium for execution by the first processor and, when executed, configured to cause the first processor to perform operations comprising:

authenticating, by a client device, a host device that is coupled to the client device by verifying by the client device a signature generated by the host device using a cryptographic authentication key that is known to the client device and the host device;

in response to authenticating the host device, setting a parameter in a secure device associated with the client device;

based on setting the parameter in the secure device, sending, by the client device and to the host device, a parent public key and a certificate associated with the parent public key, wherein the parent public and private keys are cryptographic keys, and the certificate is a cryptographic certificate that is generated by a certificate authority trusted by the host device and the client device prior to deployment of the client device, wherein the parent private and public key pair and the certificate are stored in a persistent storage included in the secure device prior to deployment of the client device, and wherein the parent public key is verified by the host device using a root public key associated with the certificate authority, the root public key stored in the host device prior to deployment of the host device;

receiving, at the client device, instructions from the host device for generating a child private and public key pair;

in response to receiving the instructions, generating, by the client device, a child private key based on a first random number produced within the secure device, and a child public key associated with the child private key, wherein the child private and public keys are cryptographic keys that are generated within the secure device;

computing, by the client device, a first signature on the child public key using the parent private key, wherein the first signature is a cryptographic signature and computing the first signature comprises:

combining, using the secure device, a nonce with the child public key to generate a digest;

combining the digest with information associated with the secure device; and generating, by the secure device, the first signature by performing an asymmetric cryptographic signature computation, using the parent private key, on the combination of the digest and the information associated with the secure device; and sending, by the client device, the child public key and the first signature to the host device.

11. The system of claim 10, wherein the information associated with the secure device includes at least one of state information of the secure device, key storage configuration information, key storage state information and command parameters.

12. The system of claim 10, wherein the first instructions that are configured to cause the first processor to perform operations wherein setting the parameter in the secure device include first instructions that are configured to cause the first processor to perform operations comprising:

setting a bit included in the secure device indicating that the host device has been authenticated, wherein the bit is associated with the parent private key.

13. The system of claim 12, wherein the first instructions that are configured to cause the first processor to perform operations comprising sending the parent public key and the certificate associated with the parent public key to the host device based on setting the parameter in the secure device include first instructions that are configured to cause the first processor to perform operations comprising:

determining whether the bit is set in the secure device; and in response to determining that the bit is set in the secure device, sending the parent public key and the certificate associated with the parent public key to the host device, and generating the child private key.

14. The system of claim 10, comprising:

a second processor; and second instructions encoded in a non-transitory machine-readable second medium for execution by the second processor and, when executed, configured to cause the second processor to perform operations comprising:

receiving, at the host device, the parent public key and the certificate associated with the parent public key from the client device;

verifying, by the host device, validity of the parent public key by checking the signature on the certificate using the root public key;

based on verifying the parent public key as valid, sending instructions from the host device to the client device, the instructions directing the client device to generate the child private and public key pair;

in response to sending the instructions, receiving, at the host device, the child public key and the first signature; and verifying, by the host device, validity of the child public key by verifying correctness of the first signature using the verified parent public key.

15. The system of claim 10, wherein a copy of the authentication key is stored in the persistent storage included in the secure device, and wherein authenticating the host device by the client device comprises:

sending, by the client device, a first cryptographic challenge to the host device, wherein the first cryptographic challenge is sent for authenticating the host device;

receiving, at the client device, a response to the first cryptographic challenge, the response including an initial signature associated with the first cryptographic challenge that is signed with an authentication key available to the host device, wherein a copy of the authentication key is stored in persistent storage included in the secure device;

verifying, by the client device, correctness of the initial signature using the copy of the authentication key stored in the persistent storage; and authenticating, by the client device, the host device based on verifying the correctness of the initial signature.

16. The system of claim 15, comprising:

a second processor; and second instructions encoded in a non-transitory machine-readable second medium for execution by the second processor and, when executed, configured to cause the second processor to perform operations comprising:

receiving, at the host device, the first cryptographic challenge from the client device;

accessing, by the host device, the authentication key that is available to the host device;

computing, by the host device, the initial signature on the first cryptographic challenge using the authentication key; and sending, by the host device, the initial signature to the client device.

17. The system of claim 15, wherein the authentication key is stored in the persistent storage in the secure device and in the host device prior to deployment of the client device and the host device respectively.

18. The system of claim 15, wherein the authentication key includes a 256-bit Secure Hash Standard hash-based message authentication code (SHA-256 HMAC) key.

19. The system of claim 10, wherein the first instructions are configured to cause the first processor to perform operations comprising:

receiving, at the client device and from the host device, a second cryptographic challenge including a second random number;

computing, by the client device, a second signature on the second cryptographic challenge using the child private key generated by the client device; and sending, by the client device and to the host device, a response to the second cryptographic challenge, the response including the second signature.

20. The system of claim 19, comprising:

a second processor; and second instructions encoded in a non-transitory machine-readable second medium for execution by the second processor and, when executed, configured to cause the second processor to perform operations comprising:

sending, by the host device, the second cryptographic challenge to the client device;

receiving, at the host device, a response to the second cryptographic challenge including the second signature;

verifying, by the host device, correctness of the second signature using the child public key that is received from the client device; and based on verifying correctness of the second signature, storing, by the host device, the child public key as a trusted key.

21. The system of claim 10, wherein the secure device includes an integrated circuit microprocessor.

22. The system of claim 10, wherein at least one of the parent private and public key pair and the child private and public key pair are generated using elliptic curve cryptography.

23. A non-transitory machine-readable medium that stores instructions, which, when executed by one or more processors, are configured to cause the one or more processors to perform operations comprising:

authenticating, by a client device, a host device that is coupled to the client device by verifying by the client device a signature generated by the host device using a cryptographic authentication key that is known to the client device and the host device;

in response to authenticating the host device, setting a parameter in a secure device associated with the client device;

based on setting the parameter in the secure device, sending, by the client device and to the host device, a parent public key and a certificate associated with the parent public key, wherein the parent public and private keys are cryptographic keys, and the certificate is a cryptographic certificate that is generated by a certificate authority trusted by the host device and the client device prior to deployment of the client device, wherein the parent private and public key pair and the certificate are stored in a persistent storage included in the secure device prior to deployment of the client device, and wherein the parent public key is verified by the host device using a root public key associated with the certificate authority, the root public key stored in the host device prior to deployment of the host device;

receiving, at the client device, instructions from the host device for generating a child private and public key pair;

in response to receiving the instructions, generating, by the client device, a child private key based on a first random number produced within the secure device, and a child public key associated with the child private key, wherein the child private and public keys are cryptographic keys that are generated within the secure device;

computing, by the client device, a first signature on the child public key using the parent private key, wherein the first signature is a cryptographic signature and computing the first signature comprises:

combining, using the secure device, a nonce with the child public key to generate a digest;

combining the digest with information associated with the secure device; and generating, by the secure device, the first signature by performing an asymmetric cryptographic signature computation, using the parent private key, on the combination of the digest and the information associated with the secure device; and sending, by the client device, the child public key and the first signature to the host device.

24. The non-transitory machine-readable medium of claim 23, wherein the information associated with the secure device includes at least one of state information of the secure device, key storage configuration information, key storage state information and command parameters.

25. The non-transitory machine-readable medium of claim 23, wherein the instructions that are configured to cause the one or more processors to perform operations comprising setting the parameter in the secure device include instructions that are configured to cause the one or more processors to perform operations comprising:
   setting a bit included in the secure device indicating that the host device has been authenticated, wherein the bit is associated with the parent private key.

26. The non-transitory machine-readable medium of claim 25, wherein the instructions that are configured to cause the one or more processors to perform operations comprising sending the parent public key and the certificate associated with the parent public key to the host device based on setting the parameter in the secure device include instructions that are configured to cause the one or more processors to perform operations comprising:
   determining whether the bit is set in the secure device; and
   in response to determining that the bit is set in the secure device, sending the parent public key and the certificate associated with the parent public key to the host device, and generating the child private key.

\* \* \* \* \*

UNITED STATES PATENT AND TRADEMARK OFFICE
CERTIFICATE OF CORRECTION

PATENT NO. : 9,118,467 B2  
APPLICATION NO. : 13/800422  
DATED : August 25, 2015  
INVENTOR(S) : Kerry David Maletsky et al.

Page 1 of 1

It is certified that error appears in the above-identified patent and that said Letters Patent is hereby corrected as shown below:

IN THE CLAIMS

Column 30 Line 36 in Claim 12, delete "wherein" and insert --comprising--, therefor.

Signed and Sealed this  
Second Day of February, 2016

Michelle K. Lee  
*Director of the United States Patent and Trademark Office*